United States Patent [19]

Kadoshima et al.

[11] Patent Number: 4,793,300

[45] Date of Patent: Dec. 27, 1988

[54] ACCESSORY ATTACHMENT STRUCTURE FOR A V-SHAPED ENGINE

[75] Inventors: Yoshio Kadoshima; Atsushi Niimi, both of Saitama, Japan

[73] Assignee: Honda Giken Kogyo Kabushiki Kogyo, Tokyo, Japan

[21] Appl. No.: 922,029

[22] Filed: Oct. 21, 1986

[30] Foreign Application Priority Data

Oct. 21, 1985 [JP] Japan .......................... 60-161128[U]
Oct. 21, 1985 [JP] Japan .......................... 60-161127[U]

[51] Int. Cl.4 ........................................ F16M 1/026
[52] U.S. Cl. ........................ 123/195 A; 123/52 MV
[58] Field of Search .................... 123/195 A, 52 MV

[56] References Cited

U.S. PATENT DOCUMENTS 1,308,807 7/1919 Postel-Vinay ................ 123/195 A
2,875,746 3/1959 Brice et al. .................. 123/195 A
3,033,118 5/1962 Hulten ........................ 123/195 A
3,730,147 5/1973 Buchwald .................... 123/195 A
4,440,120 4/1984 Butler ........................... 123/52 M

FOREIGN PATENT DOCUMENTS 1067434 6/1954 France ........................ 123/195 A

*Primary Examiner*—Willis R. Wolfe, Jr.
*Assistant Examiner*—M. Macy
*Attorney, Agent, or Firm*—Lyon & Lyon

[57] ABSTRACT

A V-shaped engine has a pair of cylinder banks with a V-shaped space defined therebetween, a crank pulley disposed on one end thereof in the direction of a crankshaft, and a transmission case on an opposite end thereof. An intake manifold with a throttle body assembled thereon is disposed in the V-shaped space and positioned with the throttle body disposed over the transmission case, providing a space close to the crank pulley. At least one accessory actuatable by the crank pulley is disposed in the last-mentioned space. The accessory is mounted on a bracket mounted on the cylinder banks. An engine mount bracket for supporting the engine on a vehicle frame projects integrally from the bracket.

12 Claims, 5 Drawing Sheets

ACCESSORY ATTACHMENT STRUCTURE FOR A V-SHAPED ENGINE

BACKGROUND OF THE INVENTION

The present invention relates to a V-shaped automobile engine and more particularly to an accessory attachment structure for such an engine.

Conventional V-shaped engines have an intake manifold disposed in the V-shaped space between the pair of cylinder banks. Generally, the intake manifold and a throttle body assembled thereon are positioned in the V-shaped space. Where accessories such as an oil pump for supplying oil to a power steering system and a battery charging generator are installed, generally they are mounted on the end of the engine body that has the crankshaft protruding therefrom with a crank pulley and positioned on lower portions of outer side walls of the cylinder banks.

With the accessories thus attached, the cylinder banks are disposed in overhanging relation to these accessories which are positioned in a relatively low location on the engine. Therefore, the accessories cannot easily be serviced such as when the tension of a belt is adjusted, and dust or other foreign matter is easily deposited from the road onto the accessories.

There has been proposed a bracket device in which accessories are mounted on a bracket attached in an erected disposition to the V-shaped engine at one end of the V-shaped space in the direction of the crankshaft. It would be desirable if that bracket be integrally formed with an engine mount bracket, thereby reducing the number of parts used.

SUMMARY OF THE INVENTION

It is an object of the present invention to provide an accessory attachment structure for V-shaped engines which allows accessories to be disposed efficiently in a V-shaped space, permits them to be easily serviced, and reduces the deposit of dust in the accessories from roads.

Another object of the present invention is to provide an accessory attachment structure which allows a V-shaped engine system to be constructed of a reduced number of parts, and is lightweight and compact.

According to the present invention, there is provided an accessory attachment structure in a V-shaped engine having a pair of cylinder banks with a V-shaped space defined therebetween,a crank pulley disposed on one end thereof in the direction of the crankshaft, and a transmission case on an opposite end thereof, the accessory attachment structure comprising an intake manifold with a throttle body assembled thereon, the intake manifold being disposed in the V-shaped space and positioned with the throttle body disposed over the transmission case, providing a space close to the crank pulley, and at least one accessory disposed in the last-mentioned space and actuatable by the crank pulley. The accessory is mounted on a bracket mounted on the cylinder banks.

According to the present invention, there is also provided an accessory attachment structure for a V-shaped engine having a pair of cylinder banks with a V-shaped space defined therebetween, comprising an accessory attachment bracket mounted on the cylinder banks close to one end of the V-shaped space in the direction of the crankshaft thereof, at least one accessory mounted on the accessory attachment bracket, and an engine mount bracket projecting integrally from an outer side of the accessory attachment bracket for supporting the engine on a vehicle frame.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
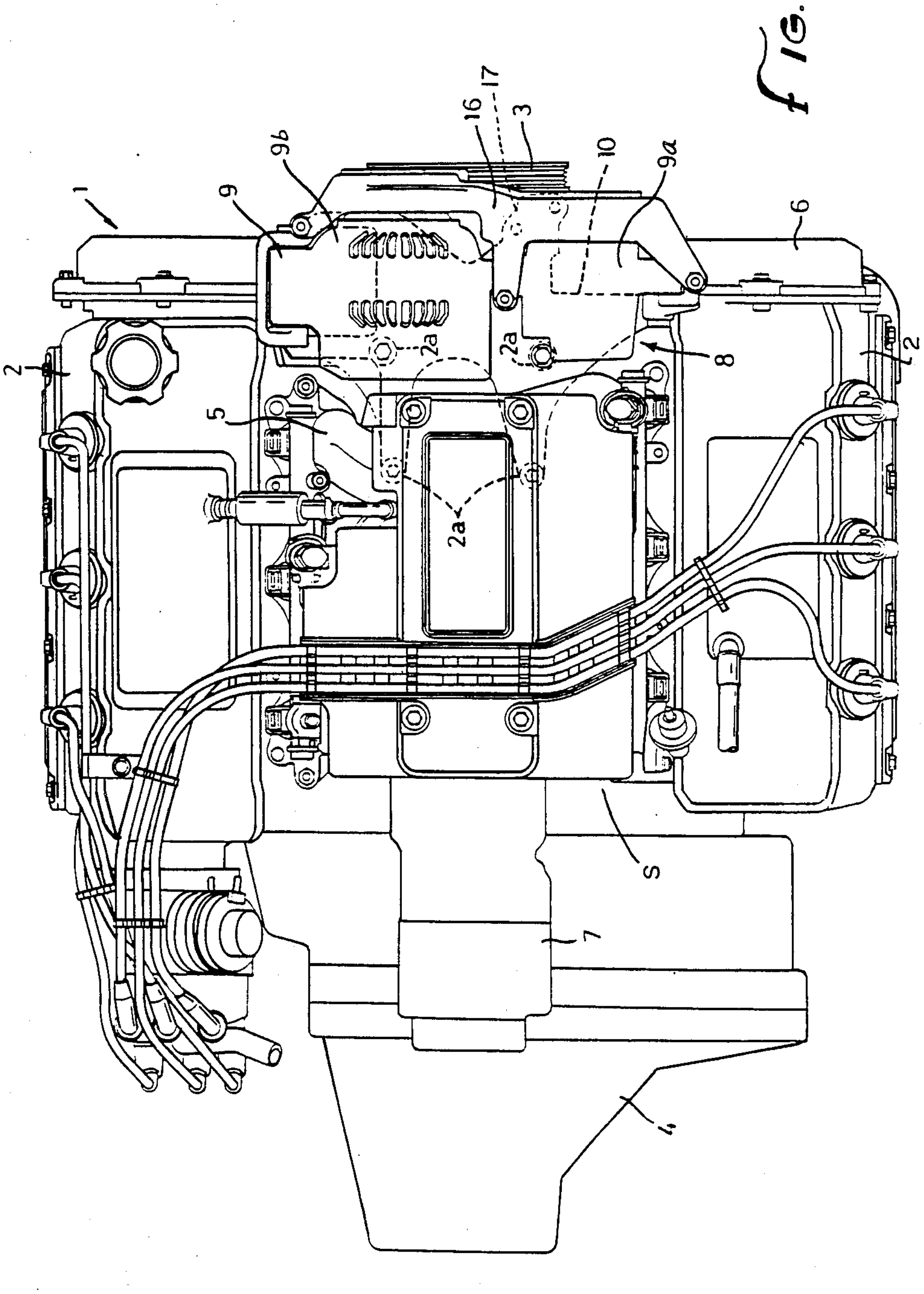
FIG. 1 is a plan view of a V-shaped engine in which an accessory attachment structure of the present invention is incorporated.
Figure 2:
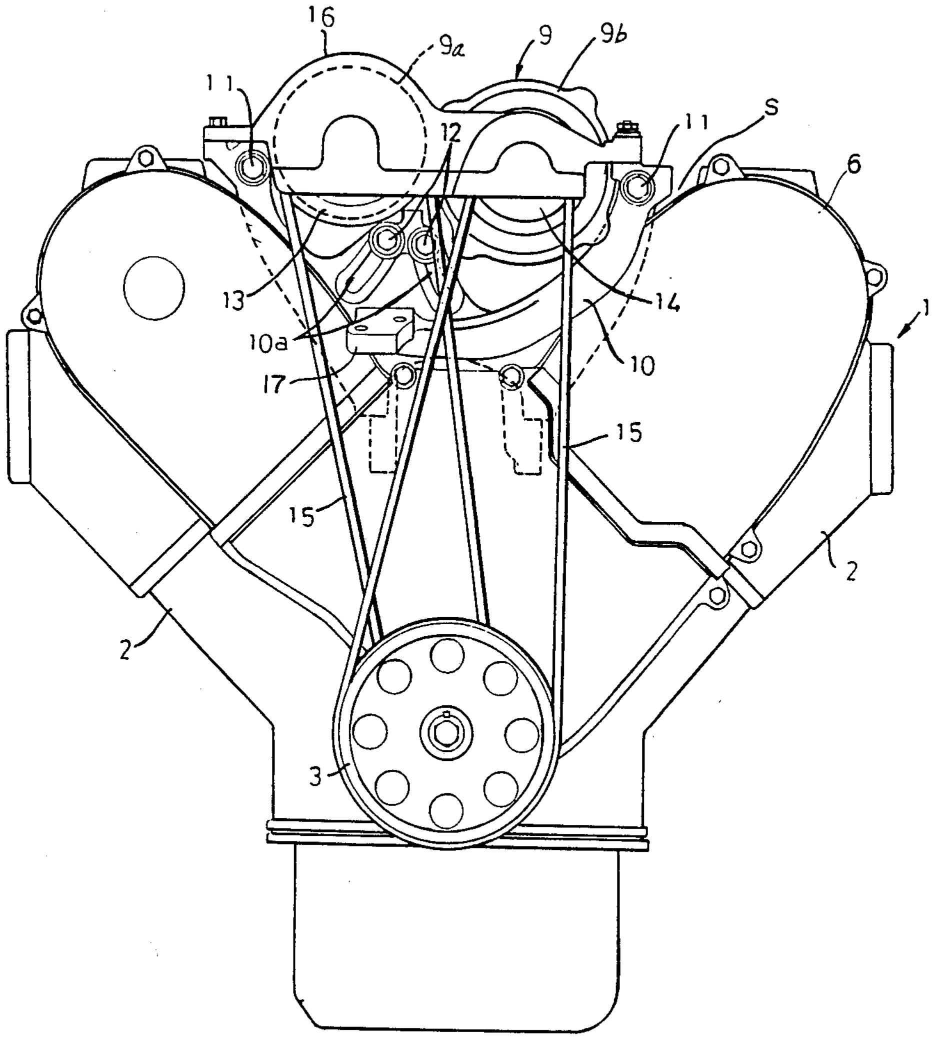
FIG. 2 is a side elevational view of the engine shown in FIG. 1.
Figure 3:
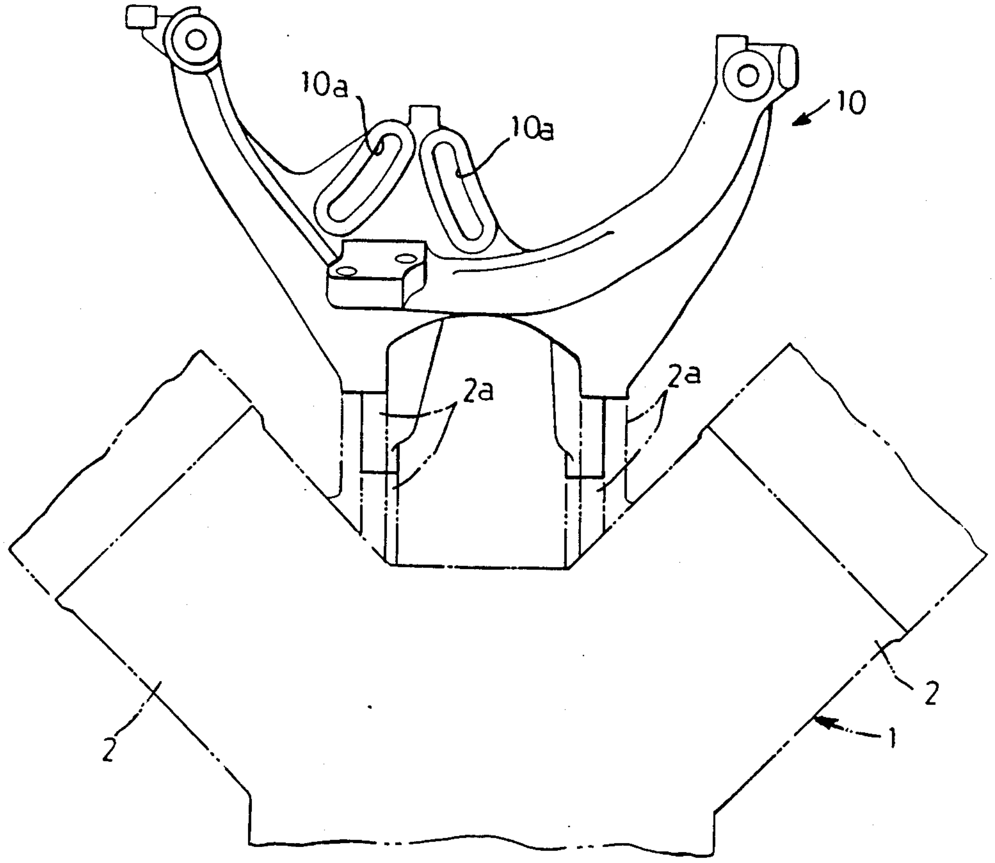
FIG. 3 is a side elevational view of a bracket on which accessories are to be mounted.

As shown in FIGS. 1 and 2, a V-shaped engine body 1 has a pair of front and rear cylinder banks 2 spaced from each other to provide a V-shaped space S therebetween. A crank pulley 3 is disposed on one end (right-hand side in FIG. 1) of the engine body 1 in the direction of the crankshaft, and a transmission case 4 is attached to the engine body 1 on the opposite end (left-hand side in FIG. 1). An intake manifold 5 is disposed in the V-shaped space S. A timing belt cover 6 is mounted on the end wall of the engine body 1 on which the crank pulley 3 is disposed. The V-shaped engine is transversely mounted on a motor vehicle such as an automobile.

A throttle body 7 is assembled on the intake manifold 5. The intake manifold 5 is positioned with the throttle body 7 extending above the transmission case 4, creating a space 8 in the V-shaped space S close to the crank pulley 3. Various accessories, generally designated 9, which are driven by the crank pulley 3 are disposed in the space 8.

More specifically, a common bracket 10 which is substantially U-shaped in side elevation is fixedly mounted on four attachment bosses **2*a* formed on side walls of the cylinder banks 2 which face the V-shaped space S. The accessories 9 include, for example, an oil pump 9*a* for supplying oil to a power steering system and a battery charging generator 9*b*. The oil pump 9*a* and the generator 9*b* have outer peripheral ends secured by bolts 11 to respective ends of the bracket 10, and opposite inner peripheral ends secured by bolts 12 to the bracket 10 through slots 10*a* defined in a central region of the bracket 10. The oil pump 9*a* and the generator 9*b* are angularly movable along the slots 10*a* about the bolts 11 so that V belts 15 trained around the crank pulley 3 and pulleys 13, 14 of the oil pump 9*a* and the generator 9*b* can be adjusted in tension. Covers 16 are mounted on the ends of the bracket 10 in covering relation to upper portions of the pulleys 13, 14**.

Figure 4:
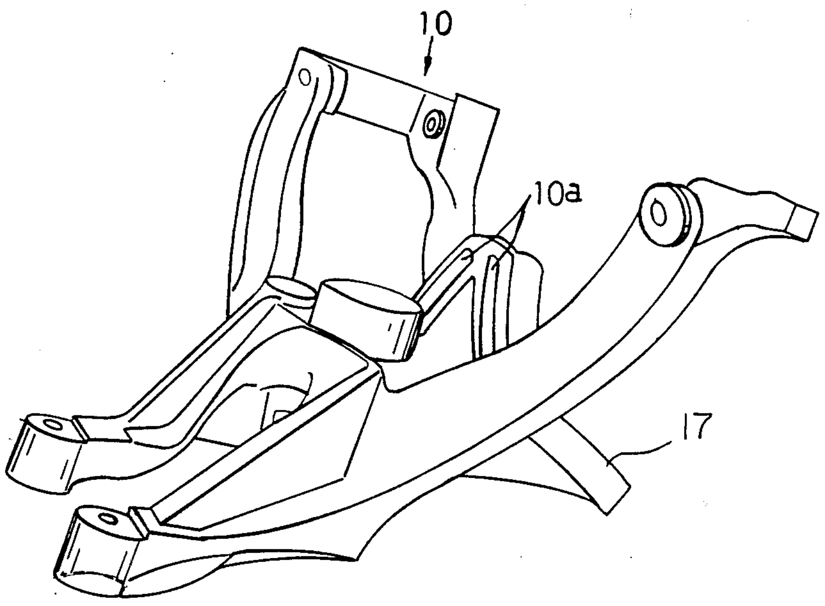
FIG. 4 is a perspective view of the bracket shown in FIG. 3 but from the opposite side.
Figure 5:
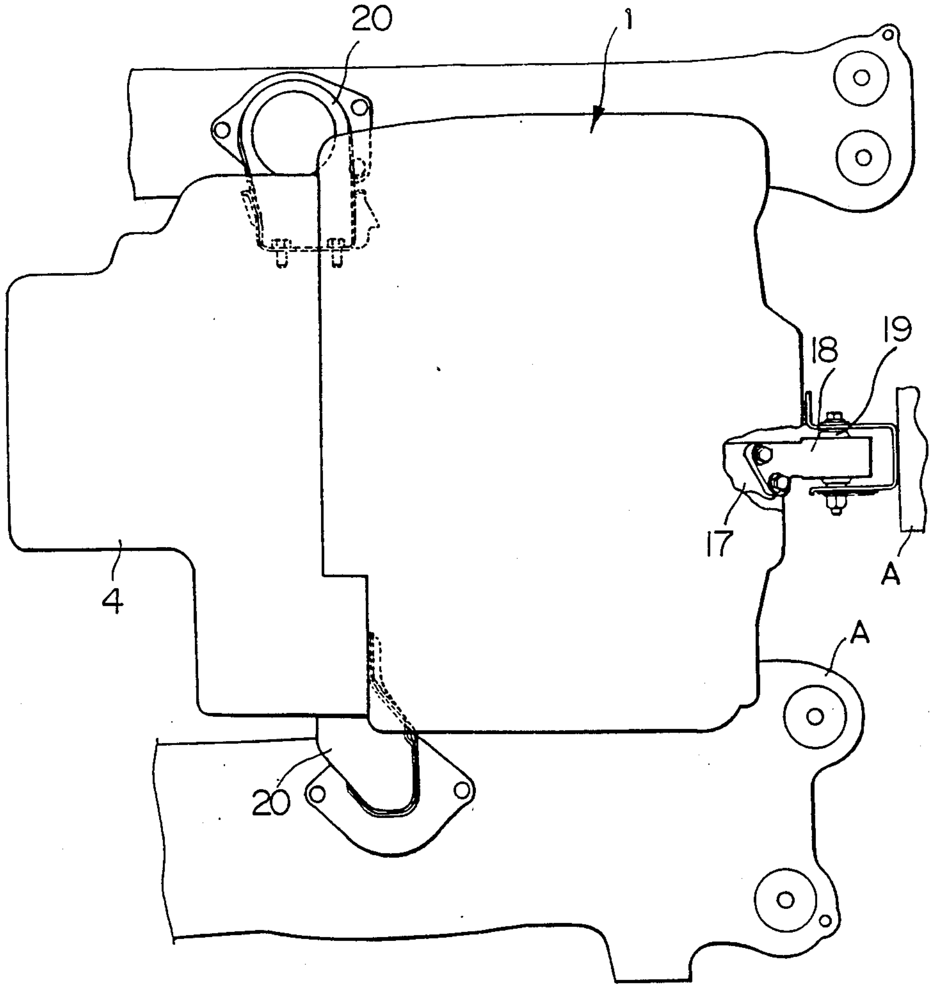
FIG. 5 is a plan view showing the V-shaped engine mounted on an automobile frame.

As shown in FIGS. 2, 4 and 5, an engine mount bracket 17 is integrally formed with an outer side surface of the bracket 10. The engine mount bracket 17 projects in the direction of the crankshaft below the slots 10*a*. A stay 18 (FIG. 5) is fixed at one end thereof to an upper surface of the engine mount bracket 17. The other end of the stay 18 is attached by a rubber mount 19 to a vehicle frame A, so that the end of the engine body 1 is fixedly mounted on the vehicle frame A. A pair of engine mount brackets 20 are mounted on side walls of the engine body 1 and also on side walls of the transmission case 4. The engine mount brackets 20 are supported by mount members on the vehicle frame A.

Since the accessories 9 are disposed in the space 8 near the crank pulley 3, they are positioned in a relatively upper portion of the engine body 1 and over the inner side walls of the cylinder banks 2. The entire size of the engine system in a direction normal to the crankshaft is not increased, and the accessories 9 that are positioned efficiently in the space 8 make the engine system relatively compact. The accessories 9 can easily be manually accessed by the worker for efficient serving such as belt tension adjustment. Dust or other foreign matter from roads is prevented from being deposited on the accessories 9 because the engine body 1 underlies the accessories 9.

Furthermore, the engine body 1 is supported on the vehicle frame A by the engine mount bracket 17 which integrally projects from the accessory attachment bracket 10. The unitary assembly of the bracket 10 and the engine mount bracket 17 contributes to a reduced number of parts of the engine and is more lightweight and compact as a whole than would be if the mount bracket 17 were separately constructed from the bracket 10.

Although a certain preferred embodiment has been shown and described, it should be understood that many changes and modifications may be made therein without departing from the scope of the appended claims.

What is claimed is:

1. An accessor attachment structure for a V-shaped engine having a pair of cylinder banks with a V-shaped space defined therebetween, a crank pulley disposed on one end of the engine in the direction of a crankshaft, and transmission case on an opposite end of the engine, comprising:

an intake manifold with a throttle body assembled thereon, said intake manifold being disposed in said v-shaped space and positioned with said throttle body disposed over said transmission case, providing a space between said pair of cylinder banks close to said crank pulley; and at least one accessory disposed in said last mentioned space and actuatable by said crank pulley.

2. An accessory attachment structure according to claim 1, further including a bracket on which said accessory is mounted, said bracket being mounted on said cylinder banks.

3. An accessory attachment structure according to claim 2, wherein said bracket is of substantially -shape having outer ends, and including two accessories closely mounted between said outer ends.

4. An accessory attachment structure according to claim 3, wherein said bracket has two slots through which said accessories are atach by respective second bolts to said bracket, whereby said accessories are angularly movable about said first bolts.

5. An accessory attachment structure according to claim 2, wherein said bracket includes an integral engine mount bracket by which said engine can be supported on a vehicle frame.

6. An accessory structure in a V-shaped engine with a crankpulley at one end and transmission case at the opposite end having a pair of cylinder banks with a v-shaped space defined therebetween, comprising:

an accessory attachment bracket mounted between said cylinder banks close to the crankpulley end of said V-shaped space;

at least one accessory mounted on said accessory attachment bracket with the accessory being set back between said cylinder banks within the crankpulley end of the V-shaped space; and an engine mount bracket projecting integrally from an outer side of said accessory attachment bracket for supporting the engine on a vehicle frame.

7. In an accessory attachment structure for a V-shaped space defined therebetween, an improvement comprising, an accessory attachment bracket having means for mounting on one end of the engine in tee V-shaped space between said pair of cylinder banks, and said attachment brackets having means for mounting at least one accessory thereon in a position in the V-shaped space between said pair of cylinder banks.

8. The structure of claim 7 wherein said attachment bracket includes engine mount means for supporting the engine in a vehicle.

9. The structure of claim 7 wherein said means for mounting at least one accessory includes a pivotal support mount and an adjustment slot support mount for adjustably supporting the accessory.

10. The structure of claim 7 wherein there are two of said means for mounting at least one accessory which means are provided for closely mounting two accessories side-by-side.

11. The structure of claim 10 wherein said two means for mounting at least one accessory include means for adjustably mounting the two accessories.

12. The structure of claim 7 wherein an intake manifold is mounted in the V-shaped space and extends away from the attachment bracket for providing space for said at least one accessory.

* * * * *